(12) United States Patent
Sun et al.

(10) Patent No.: US 12,434,214 B1
(45) Date of Patent: Oct. 7, 2025

(54) DEVICES AND METHODS FOR MULTI-SYSTEM BIOMASS AND COAL CO-COMBUSTION TO PREPARE GRAPHITE SAMPLE

(71) Applicant: CHANGZHOU UNIVERSITY, Jiangsu (CN)

(72) Inventors: Tanglei Sun, Changzhou (CN); Tingzhou Lei, Changzhou (CN); Ruisi Wang, Changzhou (CN); Yantao Yang, Changzhou (CN); Peng Liu, Changzhou (CN); Peiyu Sun, Changzhou (CN); Ailing He, Changzhou (CN); Yinchen Wang, Changzhou (CN); Yandong Xing, Changzhou (CN); Yang Wang, Changzhou (CN); Yongbo Shou, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 19/218,571

(22) Filed: May 26, 2025

Related U.S. Application Data

(63) Continuation-in-part of application No. PCT/CN2025/084728, filed on Mar. 25, 2025.

(30) Foreign Application Priority Data

May 31, 2024 (CN) .......................... 202410701916.3

(51) Int. Cl.
*B01J 8/06* (2006.01)
*C01B 32/205* (2017.01)

(52) U.S. Cl.
CPC ............... *B01J 8/065* (2013.01); *B01J 8/067* (2013.01); *C01B 32/205* (2017.08);
(Continued)

(58) Field of Classification Search
CPC .. B01J 8/065; B01J 8/067; B01J 2208/00504; B01J 2208/021; B01J 2208/065;
(Continued)

(56) References Cited

FOREIGN PATENT DOCUMENTS

| CN | 108051563 A | 5/2018 |
|---|---|---|
| CN | 108303297 A | 7/2018 |

(Continued)

OTHER PUBLICATIONS

Zhang, et al., Synergistic effect and volatile emission characteristics during co-combustion of biomass and low-rank coal, Energy 2024; 289: 130015, pp. 1-12 (Year: 2023).*

(Continued)

*Primary Examiner* — Daniel C. McCracken
(74) *Attorney, Agent, or Firm* — PORUS IP LLC

(57) ABSTRACT

The present disclosure relates to a device for multi-system biomass and coal co-combustion to prepare a graphite sample. The device includes an oxygen cylinder, a tubular furnace, a transition assembly, a flue gas filter, an impurity gas absorption assembly, a transfer assembly, a raw sample oxidation assembly, and a vacuum pump. The oxygen cylinder is configured to provide oxygen for a combustion reaction. The tubular furnace is configured to provide heat for the combustion reaction. The transition assembly is configured to cool combustion flue gas. The flue gas filter is configured to remove particulate impurities from the combustion flue gas. The impurity gas absorption assembly is configured to remove impurity gas from the combustion flue gas. The transfer assembly is configured to remove moisture and the impurity gas from the combustion flue gas.

7 Claims, 3 Drawing Sheets

(52) U.S. Cl.
CPC .................... *B01J 2208/00504* (2013.01);
*B01J 2208/021* (2013.01); *B01J 2208/065* (2013.01)

(58) Field of Classification Search
CPC ... C01B 32/205; C01B 32/182; C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/21; C01B 32/215; C01B 32/22; C01B 32/225; C01B 32/23
See application file for complete search history.

(56) References Cited

FOREIGN PATENT DOCUMENTS

| CN | 207946261 U | 10/2018 |
| CN | 110143590 A | 8/2019 |
| CN | 115078058 A | 9/2022 |
| CN | 118624330 A | 9/2024 |
| JP | 2014085209 A | 5/2014 |
| JP | 2021179432 A | 11/2021 |
| KR | 20100066098 A | 6/2010 |

OTHER PUBLICATIONS

Wang, et al., Esstablishment and verification of a metering scheme for biomass-coal blending ratios based on 14C determination, Fuel 2022; 327: 125198, pp. 1-9 (Year: 2022).*

Wang, et al., Research Progress on the Determination of Blending Ratio Between Biomass and Coal by the 14C Method Based on AMS, China Forest Products Industry 2023; 60(10): 33-39 (Year: 2023).*

First Office Action in Chinese Application No. 202410701916.3 mailed on Nov. 1, 2024, 12 pages.

Notification to Grant Patent Right for Invention in Chinese Application No. 202410701916.3 mailed on Feb. 24, 2025, 5 pages.

Wang, Ruisi et al., Research Progress on the Determination of Blending Ratio Between Biomass and Coal by the 14C Method Based on AMS, China Forest Products Industry, 60(10): 33-39, 2023.

Wang, Yinchen et al., Establishment and verification of a metering scheme for biomass-coal blending ratios based on 14C determination, Fuel, 9 pages, 2022.

* cited by examiner

DEVICES AND METHODS FOR MULTI-SYSTEM BIOMASS AND COAL CO-COMBUSTION TO PREPARE GRAPHITE SAMPLE

CROSS-REFERENCE TO RELATED APPLICATIONS

The application is a continuation-in-part of International Application No. PCT/CN2025/084728, filed on Mar. 25, 2025, which claims priority to Chinese Patent Application No. 202410701916.3, filed on May 31, 2024, the entire contents of each of which are hereby incorporated by reference.

TECHNICAL FIELD

The present disclosure relates to the field of coupled combustion technology of coal and biomass, and in particular, to a device and method for multi-system biomass and coal co-combustion to prepare a graphite sample.

BACKGROUND

Biomass and coal coupled combustion may not only improve the utilization of biomass resources but also alleviate the impact of environmental pollution generated by coal combustion, thereby achieving an effect of emission reduction to meet market requirements of carbon trading. The widespread application of biomass and coal co-combustion technology in power plants requires high-precision measurement of a biomass blending ratio. In order to avoid a possible lack of impartiality brought about by a human weighing factor during a detection at an input side, a manner of detecting the 14 C content in the coupled combustion flue gas from an output side is generally adopted to obtain a ratio of biomass to coal in raw materials at the input side. The carbon exists in nature in three isotopes, namely 13 C, 12 C, and 14 C, of which 14 C is a radiocarbon isotope, with an abundance of about $1.18 \times 10^{-10}\%$ in nature and a half-life of about 5730±40 years. Fossil fuels tend to have zero 14 C due to decay over hundreds of millions of years, while the biomass is constantly cycling carbon with the atmosphere, where the 14 C content is essentially the same as those in the atmosphere. Therefore, given the difference in the 14 C content of biomass fuels and fossil fuels, the blending ratio of the biomass fuels may be analyzed by the 14 C content of the flue gas emitted from a power plant. Currently, the 14 C detection manner is mainly used for the measurement of the output side, in which the 14 C detection manner based on the Accelerator Mass Spectrometry (AMS) instrument is able to carry out the 14 C content measurement more accurately and rapidly to obtain the blending ratio of the biomass, while the detection with the AMS instrument requires that the raw sample is made into graphite carbon first. The current graphite preparation system may only carry out the graphite preparation operation for $CO_2$ production from the biomass or the coal alone, or collect gas from the co-combustion of the biomass and the coal and convert the gas into a sample of $SrCO_3$ and then carry out a preparation operation. The graphite preparation operation of the graphite preparation system is complicated and time-consuming.

Therefore, it is necessary to provide a device and a method for multi-system biomass and coal co-combustion to prepare a graphite sample. Using the described device and method, corresponding graphite preparation operations may be performed for raw material samples from different sources, respectively, so as to make the graphite preparation process more convenient and rapid, and to promote a wider application of the AMS-based 14 C detection manner for the measurement of the biomass blending ratio, and a wider application of biomass-coal co-combustion technology in the power plants, thus adjust a structure of energy use and meet a concept of 'dual-carbon' development.

SUMMARY

In view of the problems in the above-mentioned device for multi-system biomass and coal co-combustion to prepare a graphite sample, the embodiments of the present disclosure provide a device for multi-system biomass and coal co-combustion to prepare a graphite sample in order to solve the problem of how to integrate multi-systems in preparing graphite carbon and improve a purity of the preparation.

In order to solve the above technical problems, one or more embodiments of the present disclosure provide the device for multi-system biomass and coal co-combustion to prepare the graphite sample. The device includes an oxygen cylinder, a transition assembly configured to cool combustion flue gas at a high-temperature, a flue gas filter, connected to the transition assembly and configured to remove particulate impurities from the combustion flue gas, an impurity gas absorption assembly connected to the flue gas filter via a glass tube and configured to remove impurity gas from the combustion flue gas, a transfer assembly connected to both ends of the glass tube and configured to remove moisture and the impurity gas from the combustion flue gas, and a raw sample oxidation assembly connected to the glass tube and configured to enable biomass or coal to react independently to produce carbon dioxide. The device further includes a first subsystem, a second subsystem, and a third subsystem. The first subsystem is configured to produce carbon dioxide by burning the biomass or the coal independently to prepare the graphite sample. The second subsystem is configured to produce carbon dioxide by co-combusting the biomass and the coal to prepare the graphite sample. The third subsystem is configured to produce carbon monoxide by co-combusting the biomass and the coal to prepare the graphite sample. The first subsystem includes the raw sample oxidation assembly, the transfer assembly, and a vacuum pump connected sequentially. The second subsystem includes the oxygen cylinder, the tubular furnace, the transition assembly, the flue gas filter, the transfer assembly, and the vacuum pump connected sequentially. The third subsystem includes the oxygen cylinder, the tubular furnace, the transition assembly, the flue gas filter, the transfer assembly, and the vacuum pump connected sequentially.

One or more embodiments of the present disclosure further provide a method for multi-system biomass and coal co-combustion to prepare the graphite sample, which is applied to the device for multi-system biomass and coal co-combustion to prepare the graphite sample as described above. The method includes preparing a graphite sample by the first subsystem including: closing a third valve and a fourth valve, taking the biomass or the coal and mixing with copper oxide and placing in a quartz tube, opening remaining valves and switching on the vacuum pump and then sealing the quartz tube by using a torch, and after the quartz tube has reacted at different temperatures in a muffle furnace to produce carbon dioxide and then connecting the quartz tube to the transfer assembly; and placing zinc and titanium hydride in an outer tube, placing iron in a reaction tube, evacuating using the vacuum pump, closing a sixth valve, and releasing carbon dioxide inside the quartz tube; controlling carbon dioxide to transfer into the reaction tube, placing the reaction tube into the muffle furnace for reaction to produce the graphite sample. The method further includes preparing the graphite sample by the second subsystem including: closing an eighth valve, a second valve, and a fifth valve, placing zinc and titanium hydride in the outer tube, and placing iron in the reaction tube, placing a mixture of the biomass and the coal in the low temperature zone of the tubular furnace, evacuating using the vacuum pump, raising a temperature of the tubular furnace, introducing oxygen and closing the sixth valve, continuing raising the temperature to generate the combustion flue gas, the combustion flue gas being cooled down by the transition assembly and passing through the flue gas filter to remove particulate particles; and after a combustion is completed, closing the third valve and a seventh valve, opening the sixth valve, and transferring carbon dioxide into the reaction tube using a liquid nitrogen cold trap, and placing the reaction tube in the muffle furnace to react to produce the graphite sample.

The embodiments of the present disclosure include but are not limited to the following beneficial effects: through the cooperation of the components in the device, it is possible to integrate and assemble the three subsystems, which greatly reduces the cost of preparation of the graphite samples as well as the efficiency of preparation, and at the same time it is possible to perform graphite preparation operations for three different sources of raw material samples, making the graphite preparation operation more convenient and rapid.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
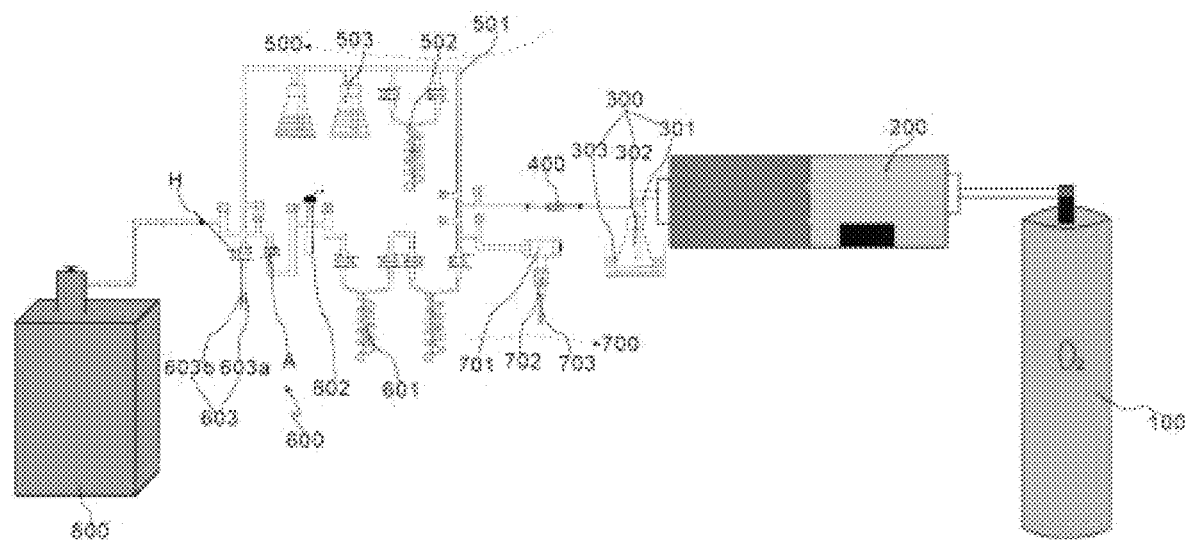
FIG. 1 is an exemplary schematic diagram illustrating a structure of a device for multi-system biomass and coal co-combustion to prepare a graphite sample according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one," "a," "an," "one kind," and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure. It should be appreciated that the preceding or following operations are not necessarily performed in an exact sequence. Instead, steps can be processed in reverse order or simultaneously. Also, it is possible to add other operations to these processes or to remove a step or steps from these processes.

FIG. 1 is an exemplary schematic diagram illustrating a structure of a device for multi-system biomass and coal co-combustion to prepare a graphite sample (i.e., a graphite carbon sample) according to some embodiments of the present disclosure.

In some embodiments, as shown in FIG. 1, the embodiments of the present disclosure provide the device for multi-system biomass and coal co-combustion to prepare the graphite sample. The device includes an oxygen cylinder 100, a tubular furnace 200, a transition assembly 300, a flue gas filter 400, an impurity gas absorption assembly 500, a transfer assembly 600, and a raw sample oxidation assembly 700.

The oxygen cylinder 100 is configured to provide oxygen for a combustion reaction.

The tubular furnace 200 is configured to provide heat for the combustion reaction.

In some embodiments, the tubular furnace 200 includes a low temperature zone and a high temperature zone. The low temperature zone is an area in the furnace tube where a temperature is below a set maximum temperature, typically near an air inlet of the tubular furnace or at both ends of the furnace tube. The high temperature zone is an area in the furnace tube where a temperature is reached or approached the set maximum temperature, typically at a concentration of heating elements or in the middle of the furnace tube.

In some embodiments, the low temperature zone of the tubular furnace 200 is connected to the oxygen cylinder 100. For example, the oxygen cylinder 100 is connected to the tubular furnace 200 by a copper tube.

In some embodiments, the tubular furnace 200 may include a resistance heating tubular furnace, an induction heating tubular furnace, a microwave tubular furnace, a gas tubular furnace, or the like, and a material of the tubular furnace 200 may include quartz, corundum, stainless steel, silicon carbide, or the like. In some embodiments, the tubular furnace 200 may be model MHY-29908.

The transition assembly 300 is configured to cool combustion flue gas at the high-temperature.

In some embodiments, the transition assembly 300 is connected to the high temperature zone of the tubular furnace 200, which allows the combustion flue gas to be cooled and avoids damage to subsequent components.

In some embodiments, the transition assembly 300 includes a transition head 301 connected to the tubular furnace 200, a conical flask 302 sleeved on the transition head 301, and a water tank 303. The conical flask 302 is placed in the water tank 303, and cooling water is contained in the water tank 303. The combustion flue gas at the high temperature in the tubular furnace 200 may enter the conical flask 302 through the transition head 301, and then be cooled by the cooling water in the water tank 303.

The flue gas filter 400 is configured to remove particulate impurities from the combustion flue gas.

In some embodiments, the flue gas filter 400, by connecting to the transition assembly 300, may remove the particulate impurities in the combustion flue gas that has been cooled and processed by the transition assembly 300 to improve the purity of $CO_2$/CO transferred to a reaction tube 603a. More descriptions about the reaction tube 603a may be found in related descriptions below.

In some embodiments, the flue gas filter 400 may include a mechanical filter, an electrostatic precipitator, a baghouse, a wet dust collector, an activated carbon adsorber, a catalytic filter, or the like. In some embodiments, the flue gas filter 400 may be model RUNSHENG304.

The impurity gas absorption assembly 500 is configured to remove impurity gas from the combustion flue gas.

In some embodiments, the impurity gas absorption assembly 500 is connected to the flue gas filter 400 via a glass tube 501, which removes the impurity gas from the filtered combustion flue gas. The impurity gas in the filtered combustion flue gas may include gases such as $NO_2$, $SO_2$, $CO_2$, $O_2$, or the like.

In some embodiments, the impurity gas absorption assembly 500 may include a first serpentine tube 502 connected to the flue gas filter 400 via the glass tube 501, and a gas-washing bottle 503. A serpentine tube (e.g., the first serpentine tube 502) may be configured to transport gases, e.g., the combustion flue gas. The gas-washing bottle 503 may contain substances for removing the impurity gas, for example, sodium hydroxide solution, pyrogallic acid solution, or the like. The combustion flue gas, after being filtered and processed by the flue gas filter 400, may enter the gas-washing bottle 503 through the first serpentine tube 502 to further remove the impurity gas.

In some embodiments, the gas-washing bottle 503 may include a first gas-washing bottle and a second gas-washing bottle. For example, the first gas-washing bottle and the second gas-washing bottle contain sodium hydroxide solution and pyrogallic acid solution, respectively, for a reaction of a third subsystem, respectively, for removing gases of $NO_2$, $SO_2$, $CO_2$, and $O_2$. More descriptions about the third subsystem may be found in related descriptions below.

In some embodiments of the present disclosure, by connecting the impurity gas absorption assembly 500 and the flue gas filter 400 via the glass tube 501, the impurity gas in the combustion flue gas may be removed, thereby improving the purity of CO transferred to the reaction tube 603a. By providing the first serpentine tube and the gas-washing bottle in the impurity gas absorption assembly, an efficient removal ability for the impurity gas is further enhanced, which helps to obtain a higher purity of target gas and improve the quality of the graphite sample produced.

The transfer assembly 600 refers to an assembly that removes moisture and the impurity gas as well as transfers gas.

In some embodiments, the transfer assembly 600, which is connected to both ends of the glass tube 501, is configured to remove the moisture and the impurity gas from the combustion flue gas to obtain pure $CO_2$ to be transferred to the reaction tube.

In some embodiments, the transfer assembly 600 may include a second serpentine tube 601 connected to the glass tube 501, a vacuum gauge 602 connected to the second serpentine tube 601, and a graphitization unit 603 connected to the vacuum gauge 602. In some embodiments, the graphitization unit 603 may include the reaction tube 603 connected to the glass tube 501. In some embodiments, the reaction tube 603a is also provided with an outer tube 603b. In some embodiments, the reaction tube 603a is ultimately connected to a vacuum pump 800.

The vacuum gauge 602 may measure gas pressure within a vacuum system. In some embodiments, the vacuum gauge 602 may include a mechanical vacuum gauge, a thermal-conductive vacuum gauge, an ionization vacuum gauge, a capacitance vacuum gauge, a hybrid vacuum gauge, or the like.

The graphitization unit 603 refers to a component for storing materials and preparing a graphite sample. The reaction tube 603a may provide a reaction space for preparing the graphite sample. The outer tube 603 may contain materials required for the reaction, such as zinc, titanium hydride, or the like.

In some embodiments, the vacuum pump 800 is connected to the transfer assembly 600 and may evacuate in a closed system (i.e., the device for multi-system biomass and coal co-combustion to prepare the graphite sample), avoiding the effect of carbon dioxide in the air.

In some embodiments, all interfaces in the transfer assembly 600 and all interfaces in the first serpentine tube 502 may adopt vertically connected ground glass ball joints A, and each ground glass ball joint A is equipped with a spherical joint clamp for fixing connection ends. The ground glass ball joint A refers to a spherical or partially spherical joint. The ground glass ball joint A allows the connection end to be deflected freely within a certain angle range (e.g., ±30°). The spherical joint clamp H refers to a clamp with a locking mechanism that restricts a rotational degree of freedom of the ground glass ball joint A to form a stable connection.

In some embodiments, the second serpentine tube 601 may be divided into two sections for removing the moisture and containing immobilized carbon dioxide, respectively. For example, a first section of the second serpentine tube 601 may remove the moisture, and a second section of the second serpentine tube 601 may contain carbon dioxide.

In some embodiments, a connection between the vacuum gauge 602 and a circulation pipeline is a vacuum gauge tube and a clamp, and the ground glass ball joint A utilizes gravity to make the interface compressed, to avoid leakage of air that is prone to occur when connected laterally. The vacuum gauge tube may convert the gas pressure in a vacuum chamber into a readable electrical signal.

In some embodiments of the present disclosure, the transfer assembly 600, by connecting both ends of the glass tube 501, removes the moisture and the impurity gas from the combustion flue gas to obtain pure $CO_2$ to be transferred to the reaction tube. By integrating the second serpentine tube, the vacuum gauge, and the graphitization unit in the transfer assembly, and by adopting vertically connected ground glass ball joints and spherical joint clamps for fixing connection ends, a flexible multi-degree-of-freedom connection and a fast sealing and fixing are achieved, which enhances an airtightness of gas transfer and convenience of operation, ensuring safety and efficiency of the preparation process.

The raw sample oxidation assembly 700 refers to an assembly for an oxidation reaction. In some embodiments, the raw sample oxidation assembly 700 is connected to the glass tube 501 and is configured to enable biomass or coal to react independently to produce carbon dioxide.

In some embodiments, the raw sample oxidation assembly 700 may include a vacuum baffle valve 701 connected to the glass tube 501, a first bellow 702, and a quartz tube 703. The vacuum baffle valve 701, the first bellow 702, and the quartz tube 703 are sequentially connected.

The vacuum baffle valve 701 refers to an assembly that isolates and regulates airflow. Before the oxidation reaction, the vacuum baffle valve 701 may be closed to isolate the glass tube 501 from an external environment, ensuring that the reaction chamber (e.g., the quartz tube 703) quickly reaches a desired vacuum level.

A bellow refers to a flexible and expandable pipeline element. The first bellow 702 may act as a transmission pipeline and compensate for installation deviations or thermal expansion displacement between the glass tube 501 and the quartz tube 703.

The quartz tube 703 may provide a high temperature oxidation environment (e.g., 800° C.-1200° C.) and the chemical inertness of the quartz ($SiO_2$) may avoid side reactions with reactive gas (e.g., $O_2$).

In some embodiments of the present disclosure, by providing the vacuum baffle valve, the first bellow, and the quartz tube in the raw sample oxidation assembly, a gas-tightness and a temperature-control condition of the oxidation reaction of the raw material are optimized to improve generating efficiency and purity of carbon dioxide.

Figure 2:
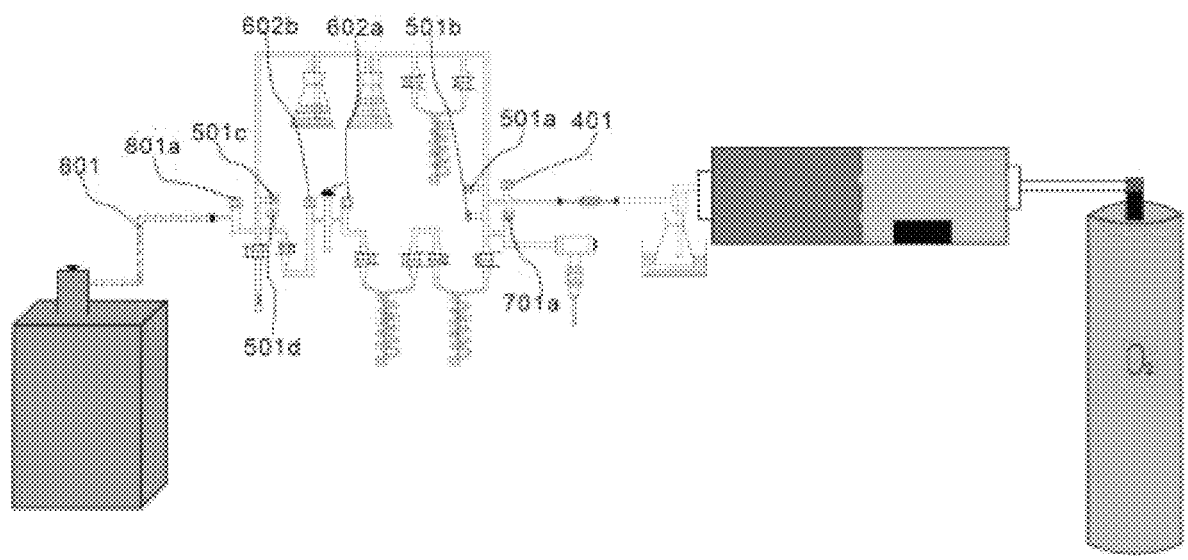
FIG. 2 is an exemplary schematic diagram illustrating valve positions for a device for multi-system biomass and coal co-combustion to prepare a graphite sample according to some embodiments of the present disclosure.

FIG. 2 is an exemplary schematic diagram illustrating valve positions for the device for multi-system biomass and coal co-combustion to prepare a graphite sample according to some embodiments of the present disclosure.

In some embodiments, as shown in FIG. 2, a first valve 401 is disposed at a connection between the flue gas filter 400 and the glass tube 501. A second valve 501a and a third valve 501b are disposed at an input end of the glass tube 501, and a fourth valve 501c and a fifth valve 501d are disposed at an output end of the glass tube 501. A sixth valve 602a and a seventh valve 602b are respectively disposed at a connection between each side of the vacuum gauge 602 and a pipeline. An eighth valve 701a is disposed at a connection between the glass tube 501 and the vacuum baffle valve 701. A ninth valve 801a is disposed at a connection between the graphitization unit 603 and a second bellow 801.

In some embodiments, the second bellow 801 connects to the vacuum pump 800 and the reaction tube 603a. The second bellow 801 acts as a transmission pipeline and compensates for installation deviations or thermal expansion displacement between the vacuum pump 800 and the reaction tube 603a.

In some embodiments of the present disclosure, by setting multi-stage valves at each key pipeline interface, a precise control of gas flow and system state is realized, which significantly enhances the flexibility and safety of the operation, and effectively prevents gas leakage and cross-contamination.

In some embodiments, the device for multi-system biomass and coal co-combustion to prepare the graphite sample may further includes a first subsystem, a second subsystem, and a third subsystem.

The first subsystem is configured to produce carbon dioxide by burning the biomass or the coal independently to prepare the graphite sample. In some embodiments, the first subsystem may include the raw sample oxidation assembly 700, the transfer assembly 600, and the vacuum pump 800 connected sequentially.

The second subsystem is configured to produce carbon dioxide by co-combusting the biomass and the coal to prepare the graphite sample. In some embodiments, the second subsystem includes the oxygen cylinder 100, the tubular furnace 200, the transition assembly 300, the flue gas filter 400, the transfer assembly 600, and the vacuum pump 800 connected sequentially.

The third subsystem is configured to produce carbon monoxide by co-combusting the biomass and the coal to prepare the graphite sample. In some embodiments, the third subsystem includes the oxygen cylinder 100, the tubular furnace 200, the transition assembly 300, the flue gas filter 400, the impurity gas absorption assembly 500, the transfer assembly 600, and the vacuum pump 800 sequentially connected.

In some embodiments of the present disclosure, through the device for multi-system biomass and coal co-combustion to prepare the graphite sample, highly efficient cooling, filtering, and removing of the impurity gas from the mixed combustion flue gas of the biomass and the coal are realized, and highly pure carbon dioxide or carbon monoxide for the graphite sample are prepared, which improves the flexibility and purity of the graphite sample preparation.

Figure 3:
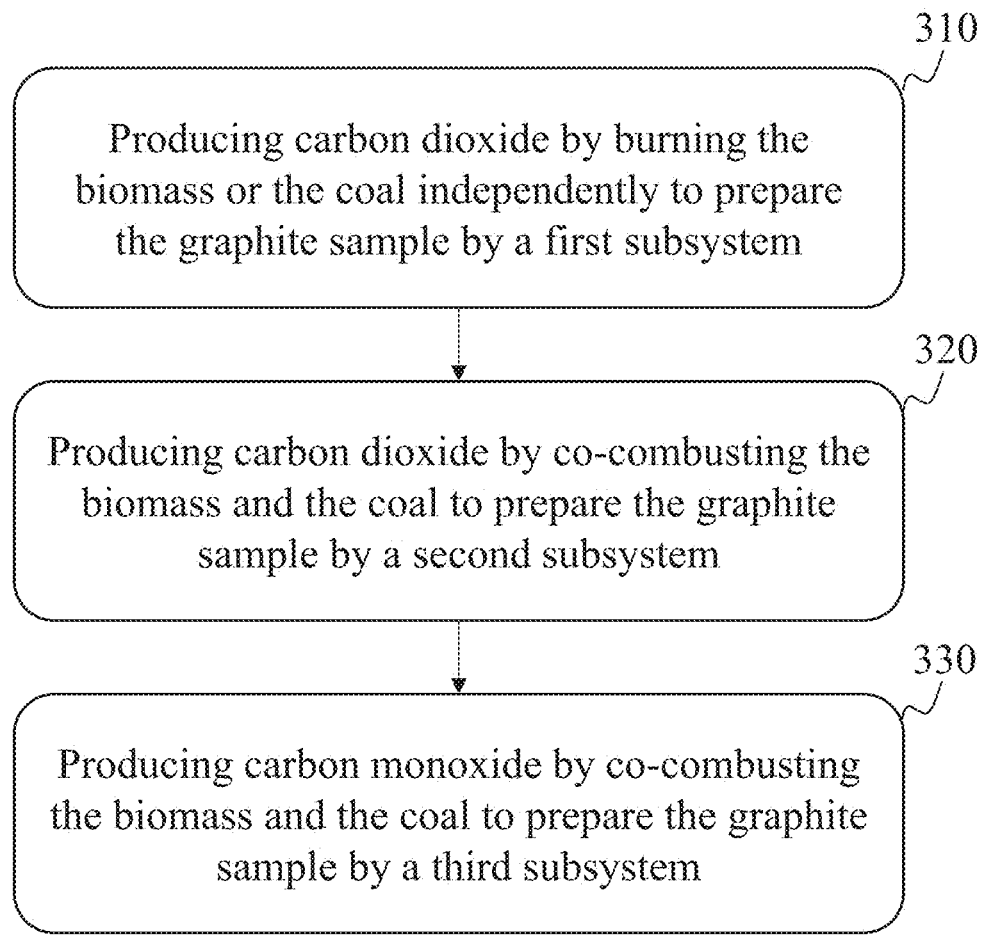
FIG. 3 is an exemplary flowchart illustrating a method for multi-system biomass and coal co-combustion to prepare a graphite sample according to some embodiments of the present disclosure.

FIG. 3 is an exemplary flowchart illustrating a method for multi-system biomass and coal co-combustion to prepare a graphite sample according to some embodiments of the present disclosure.

Some embodiments of the present disclosure further provide a method for multi-system biomass and coal co-combustion to prepare the graphite sample, which is applied to the device for multi-system biomass and coal co-combustion to prepare the graphite sample as described in any of the embodiments of the present disclosure. In some embodiments, as shown in FIG. 3, process 300 includes the following operations.

In 310, carbon dioxide is produced by burning the biomass or the coal independently to prepare the graphite sample by the first subsystem.

In some embodiments, a process for preparing the graphite sample by the first subsystem includes: closing the third valve 501b and the fourth valve 501c, taking the biomass or the coal and mixing with copper oxide and placing in the quartz tube 703, opening remaining valves and switching on the vacuum pump 800 and then sealing the quartz tube 703 by using a torch, and after the quartz tube 703 has reacted at different temperatures in a muffle furnace to produce carbon dioxide and then connecting the quartz tube 703 to the transfer assembly 600; placing zinc and titanium hydride in the outer tube 603b, placing iron in the reaction tube 603a, evacuating using the vacuum pump 800, closing the sixth valve 602a, and releasing carbon dioxide inside the quartz tube 703; controlling carbon dioxide to transfer into the reaction tube 603a, placing the reaction tube 603a and the outer tube 603b into the muffle furnace for reaction to produce the graphite sample.

In some embodiments, the biomass or the coal may contain 2 mg-3 mg of carbon and mixed with 70 mg-80 mg of copper oxide (CuO). In some embodiments, the biomass or the coal mixing with copper oxide is placed in the quartz tube 703 of the raw sample oxidation assembly 700, the remaining valves are opened and the vacuum pump 800 is switched on to evacuate the system to $10^{-2}$ Pa, then the quartz tube 703 is sealed by using the torch, the sealed quartz tube 703 is placed in the muffle furnace to react at 500° C. for 1 h, and at 900° C. for 4 h, and then the sealed quartz tube 703 is connected to the raw sample oxidation assembly 700 again. Carbon dioxide produced at the raw sample oxidation assembly 700 is then transferred to the transfer assembly 600.

In some embodiments, an amount of zinc (Zn) placed in the outer tube 603b may be 30 mg-35 mg, and an amount of titanium hydride ($TiH_2$) placed in the outer tube 603b may be 10 mg-15 mg. In some embodiments, an amount of iron (Fe) placed in the reaction tube 603a may be 3 mg-5 mg.

Because the entire device comes into contact with the air when the quartz tube 703 is reconnected, it is necessary to evacuate the device to $10^{-2}$ Pa again using the vacuum pump 800.

In some embodiments, the sixth valve 602a is closed, the first bellow 702 breaks the quartz tube 703 to release $CO_2$, and a liquid nitrogen cold trap is sleeved on an upper section of the second serpentine tube 601 to immobilize $CO_2$. For example, the quartz tube 703 may be inserted into the first bellow 702, at this time, the first bellow 702 may bend to crush the quartz tube 703 placed therein, thereby breaking the quartz tube 703. The liquid nitrogen cold trap may be used to trap gas at a low temperature to facilitate gas purification or removal of $CO_2$ impurities.

In some embodiments, the eighth valve 701a and the seventh valve 602b are closed, the sixth valve 602a is opened, the liquid nitrogen cold trap is sleeved on a tube between the sixth valve 602a and the seventh valve 602b to transfer $CO_2$ to here, and an alcohol cold trap (e.g., at a temperature of $-76°$ C.) is sleeved on the second serpentine tube 601 to remove the moisture, and after a certain period of time (e.g., 1 min), the seventh valve 602b is opened and quickly closed to remove the impurity gas when a reading of the vacuum gauge 602 drops to 0. The sixth valve 602a is closed, the liquid nitrogen cold trap is removed and $CO_2$ is qualitatived using the vacuum gauge. The ninth valve 801a is closed, the seventh valve 602b is opened and the liquid nitrogen cold trap is sleeved on the graphitization unit 603 to fix $CO_2$ into the reaction tube 603a, and then the outer tube 603b is sealed by using the torch, at this time the reaction tube 603a is placed in the outer tube 603b, and the reaction tube 603a and the outer tube 603b are together placed in the muffle furnace at 500° C. for 3 h and at 600° C. for 4 h to produce the graphite carbon sample.

In 320, carbon dioxide is produced by co-combusting the biomass and the coal to prepare the graphite sample by the second subsystem.

In some embodiments, a process for preparing the graphite sample by the second subsystem includes: closing the eighth valve 701a, the second valve 501a, and the fourth valve 501c, placing zinc and titanium hydride in the outer tube 603b, and placing iron in the reaction tube 603a, placing a mixture of the biomass and the coal in the low temperature zone of the tubular furnace 200, evacuating using the vacuum pump 800, raising a temperature of the tubular furnace 200, introducing oxygen and closing the sixth valve 602a, continuing raising the temperature to generate a combustion flue gas, the combustion flue gas being cooled down by the transition assembly 300 and passing through the flue gas filter 400 to remove the particulate particles; and after a combustion is completed, closing the third valve 501b and the seventh valve 602b, opening the sixth valve 602a, and transferring carbon dioxide into the reaction tube 603a using the liquid nitrogen cold trap, and placing the reaction tube 603a and the outer tube 603b into the muffle furnace to react to produce the graphite sample.

In some embodiments, the amount of Zn placed in the outer tube 603b of the graphitization unit 603 may be 30 mg-35 mg, the amount of $TiH_2$ placed in the outer tube 603b may be 10 mg-15 mg, and the amount of Fe placed in the reaction tube 603a may be 3 mg-5 mg.

In some embodiments, a crucible containing the mixture of the biomass and the coal (e.g., 1 g) is placed into the low temperature zone of a two-stage tubular furnace 200, the system is evacuated to $10^{-2}$ Pa using the vacuum pump 800, and running a tubular furnace program is begun. The tubular furnace program refers to a program that controls the tubular furnace to perform heating. The tubular furnace program may include: controlling the low temperature zone and the high temperature zone to first simultaneously raise to 120° C. and 250° C. respectively, at this time introducing 50 mL/min of $O_2$, and then controlling the low temperature zone and the high temperature zone to simultaneously raise to 250° C. and 400° C. respectively, and then simultaneously raise to 400° C. and 650° C. respectively, and finally raise the low temperature zone to 850° C. for 35 min and keep for 30 min, the high temperature zone raise to 850° C. for 20 min and keep for 45 min.

The sixth valve 602a is closed at the beginning of introducing the $O_2$. The combustion flue gas is cooled down by the transition assembly and then first passes through the flue gas filter 400 to remove the particulate particles, and then passes through the first section of the second serpentine tube 601 sleeved with the $-76°$ C. alcohol cold trap to remove the moisture and then is fixed in the second section of the second serpentine tube 601 sleeved with the liquid nitrogen cold trap. After the combustion is completed, the third valve 501b and the seventh valve 602b is closed, the sixth valve 602a is opened, the liquid nitrogen cold trap is sleeved on a tube between the sixth valve 602a and the seventh valve 602b to transfer to $CO_2$ to here, after a period of time (1 min), the seventh valve 602b is opened and quickly closed to remove the impurity gas when a reading of the vacuum gauge drops to 0. The sixth valve 602a is closed, the liquid nitrogen cold trap is removed and $CO_2$ is qualitatived using the vacuum gauge. The ninth valve 801a is closed, the seventh valve 602b is opened, the liquid nitrogen cold trap is sleeved to the graphitization unit 603 to fix $CO_2$ in the reaction tube, then the reaction tube is sealed by using the torch and placed in the muffle furnace to react at 500° C. for 3 h, and 600° C. for 4 h to produce the graphite carbon sample.

It should be noted that, in a common operation, $CO_2$ produced by combustion in the tubular furnace needs to be collected by a gas bag first, and then passed into the gas-washing bottle containing NaOH for absorption, and then add $NH_4Cl$ solution to adjust a pH to a preset pH (e.g., pH=10) or so, and then poured into saturated $SrCl_2$ solution, and then filtered and dried for a long period of time (e.g., 10h) to obtain $SrCO_3$ sample, and $SrCO_3$ and HCl may react and release $CO_2$ in a liquid-making $CO_2$ production device that replaces the raw sample oxidation assembly 700, and graphite is finally produced by operating operations for transferring $CO_2$ to the graphitization unit as described above.

Using the second subsystem may eliminate the above complicated operations of $CO_2$ conversion and release, saving at least 12 hours, and greatly improving efficiency. At the same time, in the common operation, it is easy to mix with external gases when adjusting the pH, resulting in the quality of the final samples produced inconsistent, however, the embodiment of the present disclosure does not require these operations, but sealing using the torch, and the overall process is integrated, ensuring an overall hermetic sealing is well protected.

In some embodiments of the present disclosure, the first subsystem and the second subsystem prepare the graphite sample by burning the biomass or the coal independently and co-combusting the biomass and the coal respectively to produce carbon dioxide, which is capable of flexibly responding to the different raw materials and process requirements, and improving the efficiency of the graphite sample preparation.

In 330, carbon monoxide is produced by co-combusting the biomass and the coal to prepare the graphite sample by the third subsystem.

In some embodiments, a process for preparing the graphite sample by the third subsystem includes: closing the third valve 501b and the fifth valve 501d, placing zinc and titanium hydride in the outer tube 603b, and placing iron inside the reaction tube 603a, placing the mixture of the biomass and the coal into the low temperature zone of the tubular furnace 200, evacuating the low temperature zone using the vacuum pump 800, raising the temperature of the tubular furnace 200, introducing the oxygen and closing the ninth valve 801a, and cooling down the combustion flue gas by the transition assembly 300 and then passing through the flue gas filter 400 to remove the particulate particles; passing the combustion flue gas into the gas-washing bottle 503 containing sodium hydroxide solution and pyrogallic acid solution respectively to remove the impurity gas, transferring carbon dioxide to the reaction tube 603a, and placing the reaction tube 603a and the outer tube 603b in the muffle furnace to react to produce the graphite sample.

In some embodiments, the amount of Zn placed in the outer tube 603b of the reaction tube 603a of the graphitization unit 603 may be 30 mg-35 mg, the amount of $TiH_2$ may be 10 mg-15 mg, and the amount of Fe placed in the reaction tube 603a may be 3 mg-5 mg.

In some embodiments, the crucible containing the mixture of the biomass and the coal (e.g., 1 g) is placed into the low temperature zone of the two-stage tubular furnace 200, the system is evacuated to $10^{-2}$ Pa using the vacuum pump 800, and running the tubular furnace program is begun, the tubular furnace program in the third subsystem being the same as the tubular furnace program in the second subsystem.

In some embodiments, the ninth valve 801a is closed at the beginning of introducing $O_2$. The combustion flue gas is cooled down by the transition assembly and then first passes through the flue gas filter to remove the particulate particles, and then passes through the serpentine tube sleeved with the alcohol cold trap (e.g., at a temperature of −76° C.) to remove the moisture, and then passes through the first gas-washing bottle (e.g., containing 0.7 L of 1.25 mol·$L^{-1}$ NaOH solution) and the second gas-washing bottle (e.g., containing 0.30 L of 1.25 mol·$L^{-1}$ pyrogallic acid solution) to remove the gases $NO_2$, $SO_2$, $CO_2$, and $O_2$, so that CO is transferred to the reaction tube 603a, and then after the combustion is completed, CO is sealed and reacted in the muffle furnace at 600° C. for 4 h to produce the graphite sample.

In some embodiments of the present disclosure, by the addition of the third subsystem, it is possible to carry out a high-precision 14C sampling of a gas-phase carbon source for an incompletely burned-out gas-phase carbon in the flue gas, to establish a corresponding calculation model, to reduce an error in the calculation of a blending ratio, and to increase the accuracy of determining the biomass blending ratio. Through the third subsystem combined with the processes of the gas-washing bottle decontamination and the transfer of the liquid nitrogen cold trap, the purity of the target gas in the combustion flue gas is further improved, and the graphite sample preparation process is optimized, which enhances the consistency of the product quality and the controllability of the process.

It is stated that all of the above grams are experimental data and are not limited to that data, and subsequently the time savings mentioned are also variable, however, the time can be greatly saved compared to the prior art.

In some embodiments, the second valve is a proportional valve, a first sensor is provided between the first gas-washing bottle and the second gas-washing bottle, a second sensor is provided after the second gas-washing bottle (i.e., at the end of the second gas-washing bottle away from the first serpentine tube 502), the first sensor and the second sensor are connected to a processor, the second valve is connected to and controlled by a PLC controller, and the processor is connected to the PLC controller; the PLC controller may be configured to: obtain a valve opening percentage of the second valve sent by the processor; adjust an opening percentage of the second valve 501a based on the valve opening percentage.

In some embodiments, the first sensor may be a $CO_2$ concentration sensor, configured to monitor a carbon dioxide ($CO_2$) concentration in real-time. The second sensor may be an $O_2$ concentration sensor, configured to monitor an oxygen ($O_2$) concentration in real-time.

The processor may be configured to process data and/or information obtained from other devices/components or parts. The processor may execute program instructions based on the data, information, and/or processing results to perform one or more of the functions described in the embodiments of the present disclosure. Merely by way of example, the processor may include but is not limited to, a central processing unit (CPU), a microprocessor MCU, or the like, or any combination thereof. In some embodiments, the processor may include a plurality of modules and different modules may be configured to execute separate program instructions.

The PLC controller may control other devices/components or parts of the device for multi-system biomass and coal co-combustion to prepare the graphite sample to perform the graphite sample preparation process described in any embodiment of the present disclosure.

In some embodiments, the processor and the PLC controller may be placed anywhere in the device for multi-system biomass and coal co-combustion to prepare the graphite sample. In some embodiments, the processor and PLC controller may be separately placed outside the device, and electrically connected to the device.

The valve opening percentage refers to a degree of opening and closing of the second valve sent by the processor. In some embodiments, the processor may determine the valve opening percentage in a plurality of ways, and more description about a specific determination manner may be found in the related description below.

In some embodiments of the present disclosure, real-time monitoring of $CO_2$ concentration and the $O_2$ concentration helps to obtain a higher purity of the target gas and to improve the quality of the produced graphite sample. Adjusting the opening percentage of the second valve according to the valve opening percentage may enable precise control of the gas flow and the system state.

In some embodiments, the second gas-washing bottle is followed by a blowback device, the blowback device being configured to blow the gas cleaned by the second gas-washing bottle back into the first gas-washing bottle or the second gas-washing bottle. The blowback device may be used to blow back the gas by providing a reverse gas flow (e.g., $N_2$).

In some embodiments, the blowback device may be a device for high-purity nitrogen ($N_2$). The high-purity $N_2$ is an inert gas that does not participate in chemical reactions, which prevents the introduction of new impurities.

In some embodiments of the present disclosure, by providing the blowback device after the second gas-washing bottle, insufficiently cleaned gas may be blown back into the gas-washing bottle for re-cleaning to optimize a cleaning effect.

In some embodiments, the vacuum pump 800 includes a pump speed adjustment module, and the vacuum pump 800 is connected to the PLC controller; the PLC controller may also be configured to: obtain a vacuum pump speed sent by the processor; adjust a pump speed of the vacuum pump based on the vacuum pump speed.

The vacuum pump speed refers to the pump speed of the vacuum pump sent by the processor. The pump speed adjustment module may be a variable frequency controller, etc.

In some embodiments of the present disclosure, by configuring the pump speed adjustment module for the vacuum pump and connecting the vacuum pump to the PLC controller, dynamic adjustment of the pump speed according to processor instructions is realized, which improves the flexibility and adaptability of a gas extraction process.

In some embodiments, the processor may be configured to: determine an initial state of mixed gas based on raw material information, combustion information, and oxygen information; and determine an initial opening percentage of the second valve based on the initial state of the mixed gas, an initial concentration of a first solution, and an initial concentration of a second solution.

The raw material information refers to weight information of mixed raw materials.

The combustion information refers to a combustion temperature, a heating rate, and a maintenance duration for the low temperature zone and the high temperature zone in at least one set tubular furnace. For example, the combustion information may include the temperatures (e.g., 120° C., 250° C., 850° C., etc.) and the maintenance durations (e.g., 30 min, 45 min, etc.) reached by raising the temperatures of the low temperature zone and the high temperature zone in the tubular furnace during the preparation of the second subsystem.

The oxygen information refers to a concentration and a rate of the oxygen being introduced into the tubular furnace.

The initial state of the mixed gas refers to components, a flow rate, and a volume of the mixed gas. The mixed gas refers to gas output from the tubular furnace after the combustion of the raw material. For example, the mixed gas simultaneously includes flue gas, the moisture, the impurity gas, CO, $CO_2$, or the like. The components of the mixed gas refer to contents or proportions of the various components, wherein CO and $CO_2$ are considered to be independent components. The volume refers to a total amount of gas.

In some embodiments, the processor may determine the initial state of the mixed gas in a plurality of ways based on the raw material information, the combustion information, and the oxygen information. For example, the processor may determine the initial state of the mixed gas based on the raw material information, the combustion information, and the oxygen information by querying a first preset table.

The first preset table includes the raw material information, the combustion information, the oxygen information, and corresponding initial states of the mixed gas. The first preset table may be constructed based on a large amount of historical experimental data. The initial states of the mixed gas corresponding to different combinations of the raw material information, the combustion information, and the oxygen information are recorded in the historical experimental data.

The first solution refers to a solution contained in the first gas-washing bottle. In some embodiments, the first solution is NaOH solution, and the first solution may be used to remove $NO_2$, $SO_2$, $CO_2$, or the like.

The second solution refers to a solution contained in the second gas-washing bottle. In some embodiments, the second solution is pyrogallic acid solution, and the second solution may be used to remove $O_2$.

The initial concentration refers to a concentration of the solution in the gas-washing bottle that is not consumed when added to the gas-washing bottle. In some embodiments, the initial concentration may be input by a human.

The initial opening percentage refers to an opening percentage when the second valve 501a is opened for the first time.

In some embodiments, the processor may determine the initial opening percentage of the second valve in a plurality of ways based on the initial state of the mixed gas, the initial concentration of the first solution, and the initial concentration of the second solution. For example, the processor may determine the initial opening percentage of the second valve based on the initial state of the mixed gas, the initial concentration of the first solution, and the initial concentration of the second solution by querying a second preset table.

The second preset table includes the initial states of the mixed gas, the initial concentrations of the first solution, the initial concentrations of the second solution, and corresponding initial opening percentages. The second preset table may be constructed based on a large amount of historical experimental data. Each of the initial opening percentages in the second preset table is determined by setting a plurality of opening percentages, with the opening percentage that has the best final gas-washing effect (e.g., the least amount of the impurity gas) as the initial opening percentage.

In some embodiments of the present disclosure, by determining the initial state of the mixed gas and the initial opening percentage of the second valve based on multi-dimensional information, a scientific initial parameter is provided for the gas processing process, which can ensure a good reaction effect and safeguard the stability of the processing process.

In some embodiments, the processor may also be configured to: determine, during a cleaning process, a volume of processed gas based on the valve opening percentage and a current processing duration; determine a current concentration of the first solution based on the $CO_2$ concentration real-time monitored, the initial concentration of the first solution, the initial state of the mixed gas, and the volume of the processed gas; determining a current concentration of the second solution based on the $O_2$ concentration real-time monitored, the initial concentration of the second solution, the initial state of the mixed gas, and the volume of the processed gas; determine a first contact duration based on the current concentration of the first solution and the initial state of the mixed gas; determine a second contact duration based on the current concentration of the second solution and the initial state of the mixed gas; and determine a target valve opening percentage based on the first contact duration and the second contact duration.

The volume of the processed gas refers to a volume of gas that has been cleaned and processed by the gas-washing bottle.

In some embodiments, the processor may multiply the flow rate and the current processing duration to obtain the volume of the processed gas. The flow rate may be determined based on the valve opening percentage through an opening-flow rate preset table. The opening-flow rate preset table includes the valve opening percentages and the corresponding flow rates. The opening-flow rate preset table may be constructed based on a large amount of historical data.

The $CO_2/O_2$ concentration real-time monitored refers to $CO_2/O_2$ concentration monitored by the first/second sensors, respectively, and indicates a residual $CO_2/O_2$ concentration after gas washing.

The current concentration of the first solution refers to a current concentration of NaOH in the first gas-washing bottle. The current concentration of the second solution refers to a current concentration of pyrogallic acid solution in the second gas-washing bottle.

In some embodiments, the processor may determine the current concentration of the first solution through a first concentration model based on the $CO_2$ concentration real-time monitored, the initial concentration of the first solution, the initial state of the mixed gas, and the volume of the processed gas.

The first concentration model refers to a model for determining the current concentration of the first solution. The first concentration model is a mathematical model. In some embodiments, the processor may determine the first concentration model based on the historical experimental data by conducting approximate fitting via a fitting algorithm. The fitting algorithm may include at least one of a linear regression, a polynomial regression, a support vector regression (SVR), a neural network, or the like.

In some embodiments, the concentration of the first solution may be determined by the following equation (1):

$$C_p^1 = C_i^1 - A \times (a \times s_i - b \times C_{CO2}) \times V_g \quad (1)$$

where $C_p^1$ denotes the current concentration of the first solution, $C_i^1$ denotes the initial concentration of the first solution, $s_i$ denotes the initial state of the mixed gas, $C_{CO2}$ denotes the $CO_2$ concentration real-time monitored, $V_g$ denotes the volume of the processed gas, and A, a, and b denote empirical parameters that need to be obtained by fitting the historical data. The initial state of the mixed gas in the equation is a value obtained by a weighted summation of individual contents in the initial state, which may reflect an overall initial concentration of $NO_2$, $SO_2$, and $CO_2$. For example, a weighted summation of the concentration of $NO_2$, $SO_2$, and $CO_2$ may be performed by a reaction factor to obtain the $s_i$. The weights of the weighted summation may be obtained by fitting the historical data.

In some embodiments, the processor determines the current concentration of the second solution in a manner similar to determining the current concentration of the first solution. For example, the current concentration of the second solution is determined by a second concentration model based on the $O_2$ concentration real-time monitored, the initial concentration of the second solution, the initial state of the mixed gas, and the volume of the processed gas.

The second concentration model refers to a model for determining the current concentration of the second solution. The second concentration model is determined similarly to the first solution concentration model.

The first contact duration refers to a contact duration between the gas and NaOH solution required to ensure a good gas-washing effect at the current concentration of the first solution. The second contact duration refers to a contact duration between the gas and pyrogallic acid solution required to ensure a good gas-washing effect at the current concentration of the second solution.

In some embodiments, the processor may determine the first contact duration based on the current concentration of the first solution and the initial state of the mixed gas through a third preset table.

The third preset table includes the current concentrations of the first solution, the initial states of the mixed gas, and corresponding first contact durations. The third preset table may be constructed based on a large amount of historical experimental data. The first contact duration in the third preset table is the contact duration that has the best final gas-washing effect (the least amount of the impurity gas) and is selected as the first contact duration by setting a plurality of contact durations.

In some embodiments, the second contact duration is determined in a manner similar to that of the first contact duration.

The target valve opening percentage refers to an adjustment target for the valve opening percentage in a current situation.

In some embodiments, the processor may determine an opening percentage corresponding to a required flow rate as the target valve opening percentage based on the opening-flow rate preset table.

The required flow rate refers to a gas flow rate that ensures a good gas-washing effect. The required flow rate is positively correlated to an effective residence volume of the gas in the gas-washing bottle and negatively correlated to the required contact duration. The effective residence volume of the gas in the gas-washing bottle may be the volume of a gas space above the solution or be set artificially.

The required contact duration refers to a contact duration between the gas and the solution in the gas-washing bottle required to ensure a good gas-washing effect. The required contact duration may be taken as the greater of the first contact duration and the second contact duration.

In some embodiments, the processor may divide the effective residence volume of the gas within the gas-washing bottle by the required contact duration to obtain the required flow rate.

In some embodiments of the present disclosure, by predicting a change in the concentration of the solution, the valve opening percentage may be adjusted in time to control the gas flow rate, so as to bring the gas and the solution into full contact and ensure the good gas-washing bottle.

In some embodiments, the processor may be configured to: obtain a plurality of candidate valve opening percentages, and for each candidate valve opening percentage: determine a current state of the mixed gas based on a historical valve opening percentage, an open duration, and the initial state of the mixed gas; determine a candidate flow rate corresponding to the candidate valve opening percentage based on the candidate valve opening percentage; predict a candidate impurity residue of the serpentine tube based on the current state of the mixed gas, the candidate flow rate, and tube information of the serpentine tube; determine a sequence of estimated $CO_2$ concentrations based on the current state of the mixed gas, the candidate flow rate, and the current concentration of the first solution; determine a sequence of estimated $O_2$ concentrations based on the current state of the mixed gas, the candidate flow rate, and the current concentration of the second solution; determine the target valve opening percentage based on candidate impurity residues, sequences of estimated $CO_2$ concentrations, and sequences of estimated $O_2$ concentrations respectively corresponding to the plurality of candidate valve opening percentages.

If the flow rate is slow, it means that the contact time is long and the gas-washing effect is good, but it may lead to the impurity gas staying in the pipeline for a long time, and the impurities may be easily residual and accumulated, especially in the serpentine tube. Thus, there is a balance here between the impurity residue and the gas-washing effect. When the gas flow rate is fast, the gas passes through a low temperature (e.g., −76° C.) serpentine tube that quickly condenses the moisture into water droplets. But if the flow rate is slow, the gas may remain in the serpentine tube too long and the water droplets may condense into ice, which may clog the tube. The flue gas filter 400 may not have completely removed small particulate particles in the impurities, and prolonged retention in the serpentine tube may also result in the small particulate particles remaining on a wall of the tube and forming a blockage. These substances that may form a clog are impurity residues.

In some embodiments, the processor may obtain the plurality of candidate valve opening percentages by uniform sampling within a candidate valve opening percentage range. The candidate valve opening percentage range is related to a first opening percentage and a second opening percentage. The first opening percentage refers to an opening percentage corresponding to the first contact duration and the second opening percentage refers to an opening percentage corresponding to the second contact duration. The first opening percentage and the second opening percentage may be determined in a manner similar to that described above for determining the target valve opening percentage based on the first contact duration and the second contact duration.

In some embodiments, the processor may determine a minimum of the first opening percentage and the second opening percentage as a minimum of the candidate valve opening percentage range and a maximum of the first opening percentage and the second opening percentage as a maximum of the candidate valve opening percentage range.

In some embodiments, the processor may determine the current state of the mixed gas in a plurality of ways based on the historical valve opening percentage, the open duration, and the initial state of the mixed gas. For example, the processor may determine the current state of the mixed gas based on the initial state of the mixed gas, the flow rate, and the open duration.

In some embodiments, the processor may determine the current state of the mixed gas by the following equation (2):

$$s_p = s_i - v \times T \quad (2)$$

where $s_p$ denotes the current state of the mixed gas, $s_i$ denotes the initial state of the mixed gas, v denotes the flow rate, and T denotes the open duration.

It should be noted that the difference between the initial state of the mixed gas and the current state of the mixed gas may reside solely in the change of the gas volume, and other information may be left unchanged by default. Therefore, the main thing determined here is the volume of the mixed gas, i.e., the current volume is determined based on the initial volume of the mixed gas.

In some embodiments, the processor may determine the candidate flow rate corresponding to the candidate valve opening percentage based on the candidate valve opening percentage in a plurality of ways. The processor may determine the candidate flow rate corresponding to the candidate valve opening percentage based on the candidate valve opening percentage through the opening-flow rate preset table. More descriptions about the opening-flow rate preset table may be found in the preceding related descriptions.

In some embodiments, the tube information may include a tube specification of the serpentine tube and a tube image. The tube specification may include a length, an inner diameter, or the like. The tube image refers to an image reflecting a direction of the tube.

The candidate impurity residue refers to an amount of the impurity residue that may be in the serpentine tube at the candidate flow rate, and may be expressed by weight.

The processor predicts the candidate impurity residue of the serpentine tube in a plurality of ways based on the current state of the mixed gas, the candidate flow rate, and the tube information of the serpentine tube. In some embodiments, the processor may predict the candidate impurity residue of the serpentine tube based on the current state of the mixed gas, the candidate flow rate, and the tube information of the serpentine tube by an impurity prediction model.

The impurity prediction model refers to a model configured to determine the candidate impurity residue. In some embodiments, the impurity prediction model is a machine learning model, e.g., a Convolutional Neural Network (CNN) model, or the like.

An input of the impurity prediction model may include the current state of the mixed gas, the candidate flow rate, and the tube information of the serpentine tube, and an output of the impurity prediction model may include the candidate impurity residue.

In some embodiments, the processor may obtain the impurity prediction model by training based on a plurality of first training samples with first labels. For example, the processor may input the plurality of first training samples into an initial impurity prediction model, construct a loss function based on outputs of the initial impurity prediction model and the first labels, iteratively update parameters of the initial impurity prediction model based on the loss function, and end the iteration when the iteration completion condition is satisfied to obtain the trained impurity prediction model. The iteratively updating manner includes but is not limited to, a gradient descent manner, and the iteration completion condition may be a convergence of the loss function or the count of iterations reaching a threshold.

In some embodiments, the first training sample may include a sample current state of the mixed gas, a sample candidate flow rate, and sample tube information of the serpentine tube. The first label is an actual candidate impurity residue corresponding to the first training sample. Both the first training sample and the first label may be obtained based on the historical experimental data.

In some embodiments, the sequence of estimated $CO_2/O_2$ concentrations may include concentrations at a plurality of moments in the future. In some embodiments, the concentrations in the sequence of estimated $CO_2/O_2$ concentrations are incrementally increasing over time. As time changes, a solution concentration decreases, the gas-washing becomes less effective, and an impurity gas concentration increases.

In some embodiments, the processor may determine the sequence of estimated $CO_2$ concentrations/sequence of estimated $O_2$ concentrations based on the current state of the mixed gas, the candidate flow rate, and the current concentration of the first solution/the current concentration of the second solution in a plurality of ways.

In some embodiments, the processor determines a sequence of estimated $CO_2$ concentrations/sequence of estimated $O_2$ concentrations based on the current state of the mixed gas, the candidate flow rate, and the current concentration of the first solution/the current concentration of the second solution through a concentration prediction model.

The concentration prediction model refers to a model configured to determine the sequence of estimated $CO_2$ concentrations or the sequence of estimated $O_2$ concentrations. In some embodiments, the concentration prediction model is a machine learning model, e.g., a Long Short-Term Memory (LSTM) recurrent neural network model, or the like.

An input of the concentration prediction model may include the current state of the mixed gas, the candidate flow rate, and the current concentration of the first solution or the current concentration of the second solution. An output may include the sequence of estimated $CO_2$ concentrations or the sequence of estimated $O_2$ concentrations.

In some embodiments, the processor obtains the concentration prediction model by training based on a plurality of second training samples with second labels. The training of the concentration prediction model is similar to the training of the impurity prediction model.

In some embodiments, the second training sample may include a sample current state of the mixed gas, a sample candidate flow rate, a sample current concentration of the first solution, or a sample current concentration of the second solution. The second label is a sequence of actual $CO_2$ concentrations or a sequence of actual $O_2$ concentrations corresponding to the second training sample. Both the second training sample and the second label may be obtained based on the historical experimental data.

In some embodiments, the processor may determine an opening score for the plurality of candidate valve opening percentages and determine the target valve opening percentage based on the opening score.

The opening score refers to a value obtained by evaluating the candidate valve opening percentage. In some embodiments, the processor may determine the candidate valve opening percentage with the highest opening score as the target valve opening percentage. The opening score is correlated with a sub-score of the candidate impurity residue, a sub-score of the sequence of estimated $CO_2$ concentrations, and a sub-score of the sequence of estimated $O_2$ concentrations corresponding to each of the plurality of candidate valve opening percentages.

In some embodiments, for each candidate valve opening percentage, the processor may obtain the opening score of the candidate valve opening percentage by summing the sub-score of the candidate impurity residue, the sub-score of the sequence of estimated $CO_2$ concentrations, and the sub-score of the sequence of estimated $O_2$ concentrations corresponding to the candidate valve opening percentage.

The lower the candidate impurity residue, the higher the sub-score of the candidate impurity residue; the lower the average value of the sequence of estimated $CO_2$ concentrations, the higher the sub-score of the sequence of estimated $CO_2$ concentrations; and the lower the average value of the sequence of estimated $O_2$ concentrations, the higher the sub-score of the sequence of estimated $O_2$ concentrations.

In some embodiments of the present disclosure, the impurity residues and the gas-washing effect may be balanced by determining the target valve opening percentage based on the candidate impurity residue, the sequence of estimated $CO_2$ concentrations, and the sequence of estimated $O_2$ concentrations.

In some embodiments, the processor may be configured to: determine a blowback frequency of the blowback device based on the sequence of estimated $CO_2$ concentrations and the sequence of estimated $O_2$ concentrations.

The blowback frequency refers to an interval between two blowbacks.

In some embodiments, the processor may determine the blowback frequency of the blowback device based on the sequence of estimated $CO_2$ concentrations and the sequence of estimated $O_2$ concentrations in a plurality of ways. The processor may determine the blowback frequency by querying a fourth preset table based on the sequence of estimated $CO_2$ concentrations and the sequence of estimated $O_2$ concentrations.

The fourth preset table includes the sequences of estimated $CO_2$ concentrations, the sequences of estimated $O_2$ concentrations, and corresponding blowback frequencies. The fourth preset table may be constructed based on a large amount of historical experimental data.

In some embodiments of the present disclosure, by determining the blowback frequency of the blowback device, the processor may implement pre-adjustment, avoiding that blowback is performed only when the $O_2$ or $CO_2$ monitored concentration is too low, at which time a considerable amount of the impurity gas may have already been output, while simultaneously avoiding frequent blowbacks that affect the efficiency of gas-washing.

In some embodiments, the processor may be configured to: determine the required flow rate based on the first contact duration and the second contact duration; determine a flow rate at the valve based on the required flow rate and a low pump speed; and determine the target valve opening percentage based on the flow rate at the valve.

More descriptions about determining the required flow rate based on the first contact duration and the second contact duration may be found in previous related descriptions.

In some embodiments, the processor may subtract the low pump speed from the required flow rate to obtain the flow rate at the valve. More descriptions about the low pump speed may be found in the related descriptions below.

In some embodiments, the processor may determine the target valve opening percentage based on the flow rate at the valve in a plurality of ways. For example, the processor may determine the target valve opening percentage based on the flow rate at the valve via the opening-flow rate preset table.

In some embodiments of the present disclosure, the required flow rate and the valve opening percentage are determined by the contact duration, which establishes a direct correlation between the flow rate and a valve control, and improves the responsiveness and the control accuracy of the gas processing process.

In some embodiments, the processor may be configured to: open the ninth valve to evacuate at a target pump speed sequence while the third subsystem is purging the mixed gas. The target pump speed sequence includes a high pump speed and the low pump speed, the high pump speed occurs before the low pump speed, the high pump speed correlates to the initial state of the mixed gas, and the low pump speed is less than a condensation rate of carbon monoxide (CO) and the required flow rate.

After the combustion begins, the tubular furnace produces the mixed gas, and at this time, the vacuum pump 800 evacuates at the high pump speed, which allows the gas to quickly pass through the flue gas filter 400 and the first serpentine tube 502. Once there is gas passing through the first serpentine tube 502, the vacuum pump 800 switches to the low pump speed to evacuate, allowing the gas to come into full contact with the solution in the gas-washing bottle at a flat rate, and maintains a low pump speed to evacuate thereafter.

In some embodiments, the larger the volume of the mixed gas, the higher the pump speed. The higher pump speed prioritizes rapid extraction of the mixed gas, which can shorten a preprocessing time.

In some embodiments, the low pump speed is to be kept consistently less than the CO condensation rate and the required flow rate, on the one hand, to avoid the risk of pumping CO into the vacuum pump before condensation, and on the other hand, to avoid leading to insufficient contact between the gas and the solution and thus compromising the purification.

In some embodiments of the present disclosure, the gas purification process is accelerated and the purification efficiency is improved by evacuating according to the target pump speed sequence.

It should be noted that the above embodiments are only used to illustrate the technical solutions of the present disclosure rather than to limit them, and although the present disclosure has been described in detail regarding the preferred embodiments, those having ordinary skills in the art should understand that it is still possible to perform modifications or equivalent replacements to the technical solution of the present disclosure. Such modifications or equivalent replacements do not make the modified technical solution deviate from the spirit and scope of the technical solution of the present disclosure.

It should be noted that the foregoing description of the process 300 is for the purpose of exemplification and illustration only and does not limit the scope of application of the present disclosure. For those skilled in the art, various corrections and changes can be made to the process 300 under the guidance of the present disclosure. However, these corrections and changes remain within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A device for multi-system biomass and coal co-combustion to prepare a graphite sample, comprising:
   an oxygen cylinder;
   a transition assembly configured to cool combustion flue gas at a high temperature;
   a flue gas filter connected to the transition assembly and configured to remove particulate impurities from the combustion flue gas;
   an impurity gas absorption assembly connected to the flue gas filter via a glass tube and configured to remove impurity gas from the combustion flue gas;
   a transfer assembly connected to both ends of the glass tube and configured to remove moisture and the impurity gas from the combustion flue gas; and
   a raw sample oxidation assembly connected to the glass tube and configured to enable biomass or coal to react independently to produce carbon dioxide;
   wherein
   the transition assembly includes a transition head connected to a high temperature zone of a tubular furnace and a conical flask sleeved on the transition head, the conical flask is placed in a water tank, and a low temperature zone of the tubular furnace is connected to the oxygen cylinder;
   the device further comprises a first subsystem, a second subsystem, and a third subsystem;
   the first subsystem is configured to produce carbon dioxide by burning the biomass or the coal independently to prepare the graphite sample;
   the second subsystem is configured to produce carbon dioxide by co-combusting the biomass and the coal to prepare the graphite sample;
   the third subsystem is configured to produce carbon monoxide by co-combusting the biomass and the coal to prepare the graphite sample;
   the first subsystem includes the raw sample oxidation assembly, the transfer assembly, and a vacuum pump connected sequentially,
   the second subsystem includes the oxygen cylinder, the tubular furnace, the transition assembly, the flue gas filter, the transfer assembly, and the vacuum pump connected sequentially; and
   the third subsystem includes the oxygen cylinder, the tubular furnace, the transition assembly, the flue gas filter, the impurity gas absorption assembly, the transfer assembly, and the vacuum pump connected sequentially.

2. The device of claim 1, wherein the impurity gas absorption assembly includes a first serpentine tube connected to the flue gas filter via the glass tube and a gas-washing bottle.

3. The device of claim 2, wherein:
   the transfer assembly includes a second serpentine tube connected to the glass tube, a vacuum gauge connected to the second serpentine tube, and a graphitization unit connected to the vacuum gauge;
   the graphitization unit includes a reaction tube connected to the glass tube;
   the reaction tube is provided with an outer tube; and
   all interfaces in the transfer assembly and all interfaces in the first serpentine tube adopt ground glass ball joints which are vertically connected, each ground glass ball joint is equipped with a spherical joint clamp for fixing connection ends, and the reaction tube is ultimately connected to the vacuum pump.

4. The device of claim 3, wherein:
   the raw sample oxidation assembly includes a vacuum baffle valve connected to the glass tube, a first bellow, and a quartz tube; and
   the vacuum baffle valve, the first bellow, and the quartz tube are sequentially connected.

5. The device of claim 4, wherein:
   a first valve is disposed at a connection between the flue gas filter and the glass tube;
   a second valve and a third valve are disposed at an input end of the glass tube, a fourth valve and a fifth valve are disposed at an output end of the glass tube;
   a sixth valve and a seventh valve are respectively disposed at a connection between each side of the vacuum gauge and a pipeline;
   an eighth valve is disposed at a connection between the glass tube and the vacuum baffle valve;
   a ninth valve is disposed at a connection between the graphitization unit and a second bellow; and
   the second bellow connects to the vacuum pump and the reaction tube.

6. A method for multi-system biomass and coal co-combustion to prepare graphite sample, applied to the device of claim 5, wherein the method comprises:
   a process for preparing the graphite sample by the first subsystem, including:
      closing the third valve and the fourth valve, taking the biomass or the coal and mixing with copper oxide and placing in the quartz tube, opening remaining valves and switching on the vacuum pump and then sealing the quartz tube using a torch, and after the quartz tube has reacted at different temperatures in a muffle furnace to produce carbon dioxide, connecting the quartz tube to the transfer assembly;
      placing zinc and titanium hydride in the outer tube, placing iron in the reaction tube, evacuating using the vacuum pump, closing the sixth valve, and releasing the carbon dioxide inside the quartz tube; and
      controlling the carbon dioxide to transfer into the reaction tube, placing the reaction tube into the muffle furnace for reaction to produce the graphite sample; and
   a process for preparing the graphite sample by the second subsystem including:
      closing the eighth valve, the second valve, and the fifth valve, placing zinc and titanium hydride in the outer tube, and placing iron in the reaction tube, placing a mixture of the biomass and the coal in the low temperature zone of the tubular furnace, evacuating using the vacuum pump, raising a temperature of the tubular furnace, introducing oxygen and closing the sixth valve, continuing raising the temperature to generate the combustion flue gas, the combustion flue gas being cooled down by the transition assembly and passing through the flue gas filter to remove particulate particles; and after a combustion is completed, closing the third valve and the seventh valve, opening the sixth valve, transferring carbon dioxide into the reaction tube using a liquid nitrogen cold trap, and placing the reaction tube in the muffle furnace to react to produce the graphite sample.

7. The method of claim 6, wherein a process for preparing the graphite sample by the third subsystem includes:

closing the third valve and the fifth valve, placing zinc and titanium hydride in the outer tube and placing iron inside the reaction tube, placing the mixture of the biomass and the coal into the low temperature zone of the tubular furnace, evacuating the low temperature zone of the tubular furnace using the vacuum pump, raising a temperature of the tubular furnace, introducing oxygen and closing the ninth valve, and cooling down the combustion flue gas by the transition assembly and then passing through the flue gas filter to remove particulate particles; and passing the combustion flue gas into gas-washing bottles containing sodium hydroxide solution and pyrogallic acid solution respectively to remove the impurity gas, transferring carbon dioxide to the reaction tube, and placing the reaction tube in the muffle furnace to react to produce the graphite sample.

\* \* \* \* \*